(12) United States Patent
Koga et al.

(10) Patent No.: US 11,077,885 B2
(45) Date of Patent: Aug. 3, 2021

(54) ROCKER MEMBER AND VEHICLE

(71) Applicant: NIPPON STEEL CORPORATION, Tokyo (JP)

(72) Inventors: Atsuo Koga, Tokyo (JP); Satoshi Hirose, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/966,366

(22) PCT Filed: Jan. 23, 2019

(86) PCT No.: PCT/JP2019/002111
§ 371 (c)(1),
(2) Date: Jul. 30, 2020

(87) PCT Pub. No.: WO2019/151084
PCT Pub. Date: Aug. 8, 2019

(65) Prior Publication Data
US 2020/0369324 A1 Nov. 26, 2020

(30) Foreign Application Priority Data
Jan. 31, 2018 (JP) .............................. JP2018-015260

(51) Int. Cl.
*B62D 27/02* (2006.01)
*B62D 21/15* (2006.01)
(Continued)

(52) U.S. Cl.
CPC .......... *B62D 27/02* (2013.01); *B62D 21/157* (2013.01); *B62D 25/025* (2013.01); *B60K 1/04* (2013.01);
(Continued)

(58) Field of Classification Search
CPC ...... B62D 27/02; B62D 21/157; B62D 25/02; B62D 25/2072; B62D 29/00; B62D 21/15;
(Continued)

(56) References Cited

U.S. PATENT DOCUMENTS 9,033,404 B2 * 5/2015 Meaige ............... B62D 29/002
296/193.06
10,155,542 B2 * 12/2018 Gao ..................... B62D 29/008
(Continued)

FOREIGN PATENT DOCUMENTS

CN 204726526 U 10/2008
CN 205706902 U 11/2016
(Continued)

OTHER PUBLICATIONS

International Search Report for PCT/JP2019/002111 dated Apr. 2, 2019.
Written Opinion of the International Searching Authority for PCT/JP2019/002111 (PCT/ISA/237) dated Apr. 2, 2019.

*Primary Examiner* — Joseph D. Pape
*Assistant Examiner* — Dana D Ivey
(74) *Attorney, Agent, or Firm* — Birch, Stewart, Kolasch & Birch, LLP.

(57) ABSTRACT

A side sill member includes a hollow member and a reinforcing member. The hollow member includes therein mutually facing first surface and second surface. The reinforcing member stands on the first surface or the second surface inside the hollow member. The reinforcing member is a tubular component having a polygonal cross section. A longest side of the polygonal cross section has a groove extending along an axial direction of the tubular component.

8 Claims, 24 Drawing Sheets

(51) Int. Cl.
  *B62D 25/02* (2006.01)
  *B60K 1/04* (2019.01)
  *B62D 25/20* (2006.01)
  *B62D 29/00* (2006.01)
(52) U.S. Cl.
  CPC ... *B60K 2001/0438* (2013.01); *B60Y 2306/01* (2013.01); *B62D 21/15* (2013.01); *B62D 25/2072* (2013.01); *B62D 29/00* (2013.01)
(58) Field of Classification Search
  CPC ........ B62D 25/20; B62D 27/026; B60K 1/04; B60K 2001/0438; B60Y 2306/01
  USPC .......................................................... 296/209
  See application file for complete search history.

(56) References Cited

U.S. PATENT DOCUMENTS

| | | |
|---|---|---|
| 2008/0257671 A1 | 10/2008 | Jacob et al. |
| 2009/0250969 A1 | 10/2009 | Wani et al. |
| 2014/0265443 A1 | 9/2014 | Meaige et al. |

FOREIGN PATENT DOCUMENTS

| | | |
|---|---|---|
| JP | 2008-239109 A | 10/2008 |
| JP | 2014-177270 A | 9/2014 |
| KR | 10-1997-0026737 A | 6/1997 |
| KR | 10-2014-0037722 A | 3/2014 |
| KR | 10-2016-0126194 A | 11/2016 |

* cited by examiner

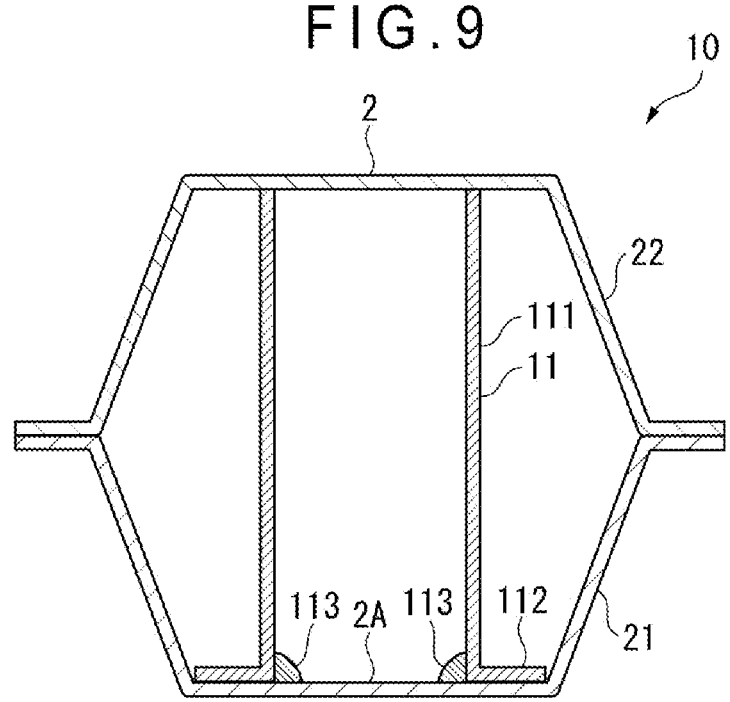

ROCKER MEMBER AND VEHICLE

TECHNICAL FIELD

The present disclosure relates to a side sill member and a vehicle.

BACKGROUND ART

Regulations on crash safety are intensifying year to year in the field of automobile industry. Accordingly, it is very important to achieve both of weight reduction (for improving fuel consumption) and crash safety.

Meanwhile, development of ecological automobiles (e.g. electric automobiles) has been advanced in view of global environmental protection. A large number of batteries are installed under the floor of electric automobiles. Accordingly, in order to restrain the batteries from being affected by an external force, it is important to enhance the performance (primarily, energy absorption performance) of a side sill member installed close to the batteries.

In order to reduce weight, vehicle framework components provided to vehicle sides (e.g. side sill) are usually made of two hat components defining a hollow cross section. A reinforcing member is sometimes installed inside the components to enhance the performance thereof. Examples of the reinforcing member include a flat plate disposed between the hat components and a press molding overlaid on the hat components.

The reinforcing member is installed, for instance, along a longitudinal direction of the vehicle framework component or in a direction orthogonal to the longitudinal direction of the vehicle framework component. A former arrangement, which partially increases the plate thickness, enhances the strength of the part where the reinforcing member is present. The reinforcing member in the latter arrangement, which serves as a partition in the vehicle framework component, increases torsion resistance and the strength of the part where the reinforcing member is present.

The deformation caused at the time of an automobile crash is broadly classified into three categories, i.e. bending deformation, axial collapse, and torsional deformation. The component subjected to the axial collapse and torsional deformation, which is likely to be entirely deformed, absorbs a large amount of energy per component weight.

In contrast, the component subjected to the bending deformation, which is deformed at a limited area, absorbs a small amount of energy per component weight. Especially, the smaller the size of an object (e.g. telephone pole) against which the component is hit (pole side impact) is, the smaller the deformation area and, consequently, the energy absorption become.

Typically, the reinforcing member is installed inside the vehicle framework component to ensure necessary energy absorption. However, the component can be hit at any part at the time of actual collision. Accordingly, the reinforcing member has to be installed to cover a certain extent of the area, disadvantageously increasing the component weight.

In view of the above, Patent Literature 1 discloses a structure for reinforcing a vehicle framework component (e.g. a door pillar and a side sill of a vehicle), in which a honeycomb structural body made of aluminum and reinforced plastic is inserted for reinforcement.

The reinforcement in the vehicle framework component by the honeycomb structural body of the invention disclosed in Patent Literature 1 leads to enhancement in the reinforcing effect and reduction in the increase of the component weight.

CITATION LIST

Patent Literature(s)

Patent Literature 1 JP 2014-177270 A

SUMMARY OF THE INVENTION

Problem(s) to be Solved by the Invention

However, according to the disclosure of Patent Literature 1, the vehicle framework component is provided by bending a thin steel sheet and the honeycomb structural body is made of the material different from steel (e.g. aluminum and reinforced plastic).

Accordingly, electrical corrosion between the different metals has to be prevented in bonding the vehicle framework component and the honeycomb structural body. Thus, the bonding process for the materials is limited (e.g. by an organic adhesive) in Patent Literature 1. Accordingly, it is difficult to efficiently reinforce the vehicle framework component at a desired point without increasing the component weight.

An object of the present disclosure is to provide a side sill member and a vehicle capable of being efficiently reinforced at a desired point without increasing the component weight.

Means for Solving the Problem(s)

A side sill member according to an aspect of the disclosure includes a hollow member and a reinforcing member, in which: the hollow member includes therein mutually facing first surface and second surface; the reinforcing member stands on the first surface or the second surface inside the hollow member; the reinforcing member is a tubular component having a polygonal cross section; and a longest side of the polygonal cross section has a groove extending along an axial direction of the tubular component.

When an external force is applied to the side sill member in a direction intersecting a longitudinal direction of the side sill member, the hollow member of the side sill member may be subjected to a bending deformation and/or a cross section of the hollow member intersecting an axis thereof may be crushed by virtue of the external force. The direction of the external force is a direction intersecting the longitudinal direction of the side sill member. In other words, the external force is applied to the hollow member in a direction intersecting the longitudinal direction of the hollow member and, to the reinforcing member, in a direction substantially along the axial direction of the reinforcing member. The term "crush" herein means that the cross section is collapsed.

At an initial stage of the deformation by the external force, the strength of the side sill member against the external force can be enhanced by the reinforcing member supporting the hollow member.

In contrast, when the hollow member is crushed in the later stage of the deformation, the reinforcing member is also collapsed in the axial direction of the reinforcing member simultaneously with a crush deformation of the hollow member. The crushing of the reinforcing member in the axial direction of the reinforcing member is referred to as "buckling." The strength of the side sill member against the external force can be enhanced by the resistance of the reinforcing member against buckling.

The tubular component having the polygonal cross section is not easily buckled because ridgelines defining the corners of the polygonal cross section exhibit a reinforcing effect for supporting the tubular component when the external force is applied to the reinforcing member. In contrast, the sides between the corners of the polygonal cross section, which are easily deformable by the external force, do not exhibit much reinforcing effect. The larger lengths of the sides, which cause deformation of the sides more easily, reduce the reinforcing effect per mass of the reinforcing member.

Accordingly, the groove is formed on the longest side of the polygonal cross section. When the long side is divided by the groove, the length of the side becomes short and thus the side is not easily deformed. Further, the ridgelines, which may be provided inside or periphery of the groove along the axial direction of the tubular component, can enhance the reinforcing effect. Thus, the strength of the tubular component of the reinforcing member against the external force can be enhanced. The groove may be a concave groove recessed from the outside to the inside of the tubular component or, alternatively, a convex portion protruded from the inside to the outside of the tubular component.

It should be noted that the reinforcing effect for supporting the tubular component decreases as angles of the corners of the cross-sectional profile of the tubular component become closer to 180 degrees. Accordingly, the cross-sectional profile of the tubular component is preferably triangular to dodecagonal.

Radii of curvature at the corners of the polygonal cross section are preferably as small as possible in view of the reinforcing effect of the ridgelines. However, the smaller radii of curvature are likely to cause breakage during a formation process. Accordingly, the radius of curvature of the cross section defined by the ridgelines is preferably in a range from 3 mm to 15 mm as measured at the plate thickness center.

The reinforcing member formed of the tubular component may be a combination of a plurality of press moldings. The reinforcing member may be provided by forming flanges on each of the press moldings and bonding the flanges.

In the above aspect of the disclosure, it is preferable that a first cover that blocks an end of the reinforcing member near the first surface is bonded to the reinforcing member.

The first cover bonded to the end of the reinforcing member near the first surface restricts the end of the reinforcing member. Accordingly, uneven deformation of the end of the reinforcing member near the first surface and consequent uneven energy absorption of the reinforcing member, which are caused by the partially applied external force, can be prevented.

In the above aspect of the disclosure, it is preferable that the first cover is bonded to the first surface.

The first cover, which is bonded to the reinforcing member, can be bonded to the hollow member, so that weldability can be enhanced.

Further, since the first cover is bonded, the number of the welded points can be reduced as compared to an instance where the end of the reinforcing member is welded to the hollow member.

Furthermore, since the first cover is bonded, a large bonding area can be ensured, so that other bonding process (e.g. the use of an adhesive) with lower bonding strength than welding is more readily employable.

In the above aspect of the disclosure, it is preferable that the first cover is bonded to a lateral portion of the hollow member between the first surface and the second surface.

The first cover, which is bonded to the lateral portion, can restrict the movement of the reinforcing member not only in the axial direction of the tubular component but also in a direction orthogonal to the axial direction. Accordingly, the strength of the reinforcing member against the external force can be further enhanced.

In the above aspect of the disclosure, it is preferable that the first cover is bonded to a part of the hollow member near the second surface with respect to the first surface.

When the hollow member is subjected to the crush deformation, a compression deformation occurs at a part of the hollow member near the second surface. Since the first cover is bonded to the part of the hollow member near the second surface, the compression deformation occurs at the bonded portion of the reinforcing member when the hollow member is subjected to the crush deformation. When a component is welded, a heat affected zone whose strength is small is sometimes formed near the welded portion. The heat affected zone may become a start point of breakage when the bonded portion is subjected to a tensile deformation. Thus, by bonding the first cover at the part near the second surface, the breakage of the part near the bonded portion can be restrained during the crush deformation of the hollow member.

In the above aspect of the disclosure, it is preferable that the end of the reinforcing member near the first surface is bonded to the hollow member through an adhesive.

The bonding strength of the adhesive is usually lower than that of welding. Accordingly, the material and amount of the adhesive is preferably selected depending on the bonding strength. For instance, the adhesive may be put into the hollow member and the end of the reinforcing member near the first surface may be buried in the adhesive put into the hollow member for bonding.

The end of the reinforcing member near the first surface and the hollow member may be bonded in various manners, and may be bonded through the adhesive. The adhesive can bond the hollow member and the reinforcing member even when the hollow member and the reinforcing member are made of different materials. Accordingly, the materials of the hollow member and the reinforcing member are more freely selectable.

In the above aspect of the disclosure, it is preferable that a second cover that blocks an end of the reinforcing member near the second surface is bonded to the reinforcing member.

When the side sill member is used in a vehicle, it does not necessarily occur that the part of the hollow member near the second surface faces an outside of the vehicle and an outer surface of the vehicle is flat. Further, an object to hit an outside of the vehicle does not necessarily have a flat surface that applies the external force (e.g. telephone poles and other vehicles). In other words, the external force is often unevenly applied on the part of the reinforcing member near the second surface. By closing the end of the reinforcing member near the second surface with the second cover, the external force is kept from being unevenly dispersed to be applied on the reinforcing member, thereby preventing deformation of the reinforcing member into an odd shape.

In the above aspect of the disclosure, it is preferable that the polygonal cross section of the reinforcing member is line-symmetric.

When the reinforcing member has an irregular cross-sectional profile, the reinforcing member is likely to be deformed in a specific direction and may be bent in the course of the deformation. In view of the above, with the reinforcing member having a line-symmetric cross section, the load is evenly dispersed across a symmetric axis, so that sufficient strength of the reinforcing member against the external force can be ensured.

In the above aspect of the disclosure, it is preferable that the reinforcing member is made of a steel material.

The components of the vehicle are usually made of steel materials. With the reinforcing member made of a steel material, bondability by welding or the like can be enhanced and the production cost and component cost of the side sill member are reducible.

In the above aspect of the disclosure, it is preferable that the hollow member is made of a steel material.

The components of the vehicle are usually made of steel materials. With the hollow member made of a steel material, bondability with other components can be enhanced and the production cost and component cost of the side sill member are reducible.

A vehicle according to another aspect of the disclosure includes the above-described side sill member, the side sill member being installed so that the first surface of the hollow member is situated near an inside of the vehicle and the second surface is situated near an outside of the vehicle.

The vehicle using the above-described side sill member can exhibit enhanced strength against bending load and external force.

Further, by placing the hollow member so that the first surface is situated near the inside of the vehicle and the second surface is situated near the outside of the vehicle, the vehicle can resist the external force from the outside of the vehicle.

BRIEF DESCRIPTION OF DRAWING(S)

FIG. 9 is a cross-sectional view showing a side sill member according to a seventh exemplary embodiment of the disclosure.

DESCRIPTION OF EMBODIMENT(S)

Exemplary embodiments of the disclosure will be described below.

1. First Exemplary Embodiment

Figure 1:
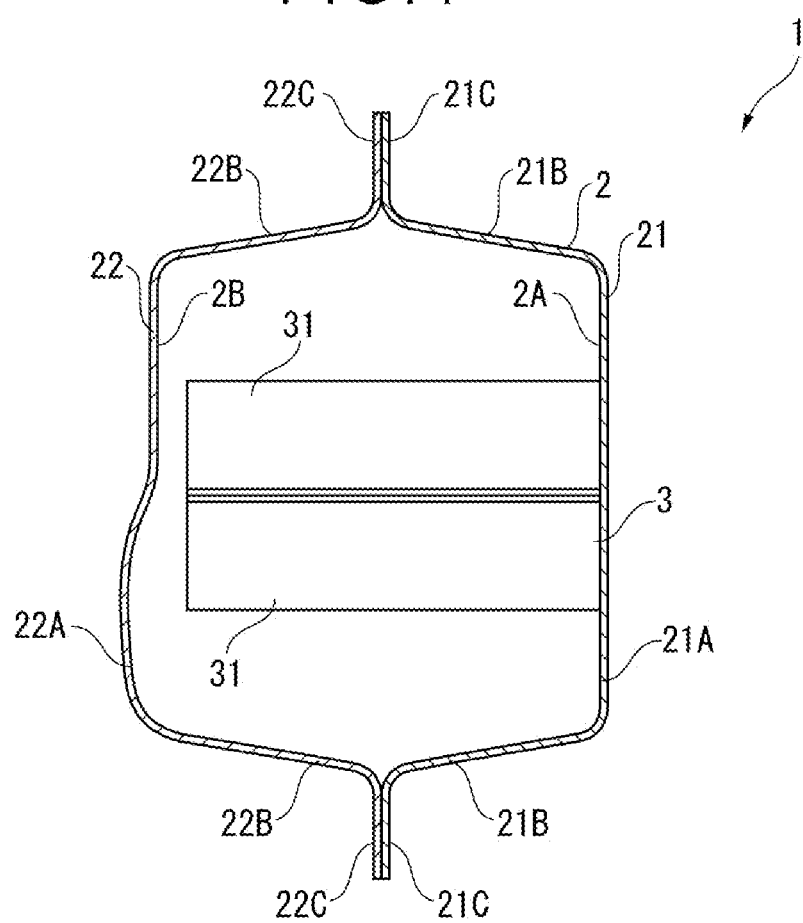
FIG. 1 is a cross-sectional view showing a side sill member according to a first exemplary embodiment of the disclosure.
Figure 2:
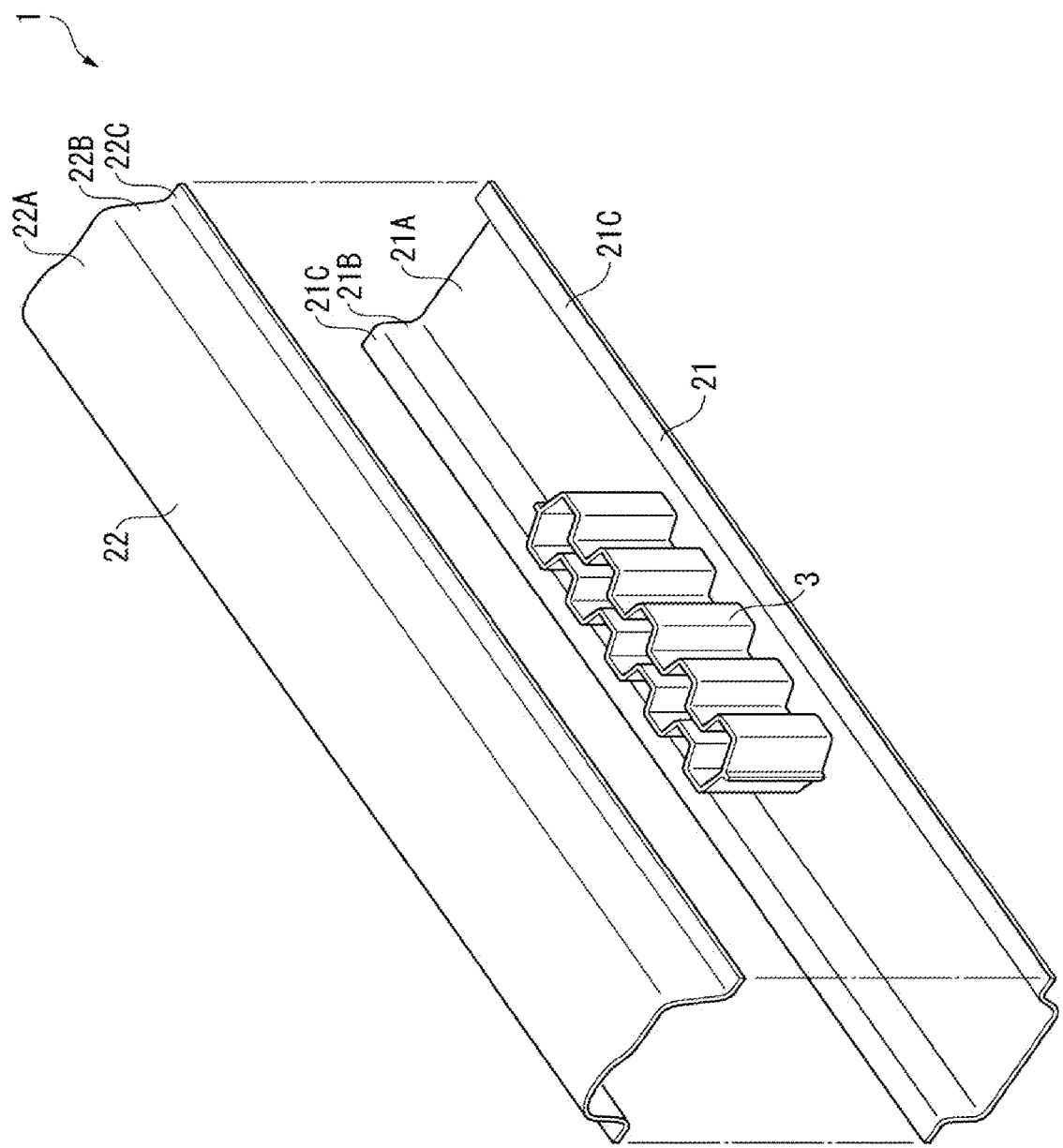
FIG. 2 is an exploded perspective view showing the side sill member according to the first exemplary embodiment.

FIGS. 1 and 2 show a side sill member 1 according to a first exemplary embodiment of the disclosure. FIG. 1 is a cross-sectional view in a direction orthogonal to an extending direction of the side sill member 1. FIG. 2 is an exploded perspective view of the side sill member 1.

The side sill member 1 is a component used for a vehicle (e.g. automobiles) as a side sill.

The side sill member 1 includes a hollow member 2 and a reinforcing member 3.

The hollow member 2 is a steel tubular component defining mutually facing first surface 2A and second surface 2B therein. The hollow member 2 is provided by combining an inner member 21 and an outer member 22. It should be noted that the hollow member 2 is not necessarily made of a steel material but may be made of other material such as aluminum, FRP (Fiber-Reinforced Plastic) or the like.

The inner member 21 is a steel component of a hat-shaped cross section, which is made of, for instance, a 1.6-mm thick high-tensile steel having 1180 MPa class tensile strength. The inner member 21 includes a bottom portion 21A, lateral portions 21B, and flanges 21C.

The bottom portion 21A, which is a bottom of the hat shape, defines an inner side of the hollow member 2 when the hollow member 2 is attached to a vehicle body. An inner surface of the bottom portion 21A is the first surface 2A of the hollow member 2.

The lateral portions 21B, which rise from respective ends (in an width direction) of the bottom portion 21A, are oppositely disposed to define an upper side and a lower side of the hollow member 2 when the hollow member 2 is attached to the vehicle body.

The flanges 21C are formed by outwardly bending respective ends of the lateral portions 21B.

The outer member 22, which is also a steel component of a hat-shaped cross section like the inner member 21, includes a bottom portion 22A, two lateral portions 22B, and flanges 22C. The outer member 22 defines an outer side of the hollow member 2 when the hollow member 2 is attached to the vehicle body. In the first exemplary embodiment, the bottom portion 22A is partially bulged outward to conform to the shape of the vehicle body. An inner surface of the bottom portion 22A is the second surface 2B of the hollow member 2.

The flanges 21C of the inner member 21 and the flanges 22C of the outer member 22 are overlapped when the hollow member 2 is assembled. The overlapped flanges 21C, 22C are bonded through spot welding or the like to be integrated, thereby forming the hollow member 2.

Figure 3:
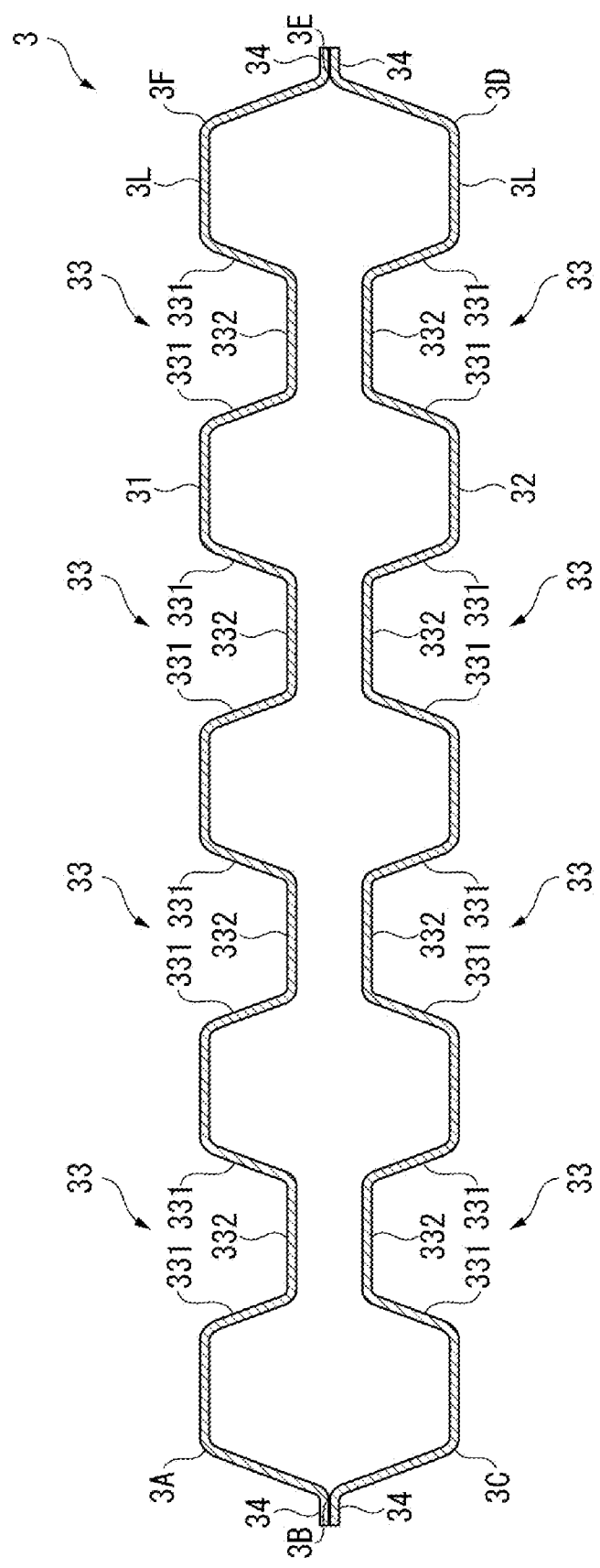
FIG. 3 is a cross-sectional view showing a structure of a reinforcing member according to the first exemplary embodiment.

As shown in FIGS. 2 and 3, the reinforcing member 3 is a tubular component having a polygonal cross section and is installed inside the hollow member 2. It should be noted that the cross section of the tubular component in the first exemplary embodiment is hexagonal.

The reinforcing member 3 stands on the first surface 2A of the hollow member 2. It should be noted that the term "stands" herein means that the reinforcing member 3 is disposed so that an axis of the reinforcing member 3 in a form of the tubular component intersects the first surface 2A. An angle defined by the axis of the reinforcing member 3 and the first surface 2A is approximately 90 degrees. Further, the hexagonal cross section of the reinforcing member 3 is flattened to define long sides and short sides, a longitudinal direction of the hexagonal cross section being aligned with a longitudinal direction of the hollow member 2.

The reinforcing member 3 includes ridgelines 3A to 3F that extend from respective vertexes of the hexagon in an axial direction of the tubular component. The ridgeline 3B and ridgeline 3E of the reinforcing member 3 are most distantly located. The reinforcing member 3 includes a pair of mutually facing long-side surfaces 3L. The hexagonal cross section of the reinforcing member 3 is, for instance, line-symmetric with respect to mating faces of flanges 34 at both ends of the cross section as shown in FIG. 3.

The reinforcing member 3 is provided by combining a first member 31 and a second member 32 each formed by bending a steel sheet. The steel sheet for the first and second members 31, 32 is, for instance, a 1.6-mm thick high-tensile steel having 590 MPa class tensile strength.

The first member 31 and the second member 32 are provided by components of the same shape and are arranged so that the pair of long-side surfaces 3L are disposed mutually in parallel. A plurality of (four, in the first exemplary embodiment) concave grooves 33 are formed in the pair of long-side surfaces 3L. The plurality of concave grooves 33 are formed so as to divide the respective long-side surfaces 3L in a cross section intersecting the axis of the reinforcing member 3.

The concave grooves 33 each include slant portions 331 and a bottom portion 332. The slant portions 331 define recessing faces angled by 120 degrees with respect to the respective long-side surfaces 3L. The bottom portion 332 connects recessing ends of the slant portions 331 and is parallel to the long-side surfaces 3L.

The flanges 34 that outwardly extend in the width direction are provided at ends of the first member 31 and the second member 32.

The reinforcing member 3 can be produced by overlaying the flanges 34 of the first member 31 and the second member 32 and welding the flanges 34 through spot welding or the like.

It should be noted that the reinforcing member 3 is not necessarily made of a steel material but may be made of other material such as aluminum, FRP (Fiber-Reinforced Plastic) and the like. However, in terms of the component cost and the production process (e.g. bonding method), the reinforcing member 3 is preferably made of the same type of material as that of the hollow member 2.

When the side sill member 1 is produced, as shown in FIG. 2, the inner member 21 is placed with the flanges 21C facing upward and the reinforcing member 3 is placed on the bottom portion 21A of the inner member 21. Next, the bottom portion 21A and the end of the reinforcing member 3 facing the first surface 2A are welded by arc welding or the like. Finally, with the flanges 22C of the outer member 22 facing downward, the flanges 21C of the inner member 21 and the flanges 22C of the outer member 22 are overlapped and welded through spot welding or the like for bonding.

As described above, the side sill member 1 is usable for a side sill forming a framework of a vehicle body. Further, the usable automobile includes not only a typical gasoline-fueled automobile but also ecological automobiles (e.g. electric automobiles).

Especially, electric automobiles house electricity-storing batteries under the floor of the vehicle body. The batteries may be damaged if an external force is applied to the vehicle body and the batteries are affected by the external force. The side sill member 1, which can absorb the crash energy applied on the side sill of the vehicle by buckling of the reinforcing member 3, can prevent the damage on the batteries housed inside the vehicle with respect to the side sill.

2. Second Exemplary Embodiment

Next, a second exemplary embodiment of the disclosure will be described below. Note that the same components and the like as those having been described above are provided with the same numerals, and detailed descriptions of the components and the like are omitted.

In the above-described first exemplary embodiment, the end of the reinforcing member 3 facing the first surface 2A is directly bonded to the bottom portion 21A of the inner member 21 defining the first surface 2A of the hollow member 2.

Figure 4:
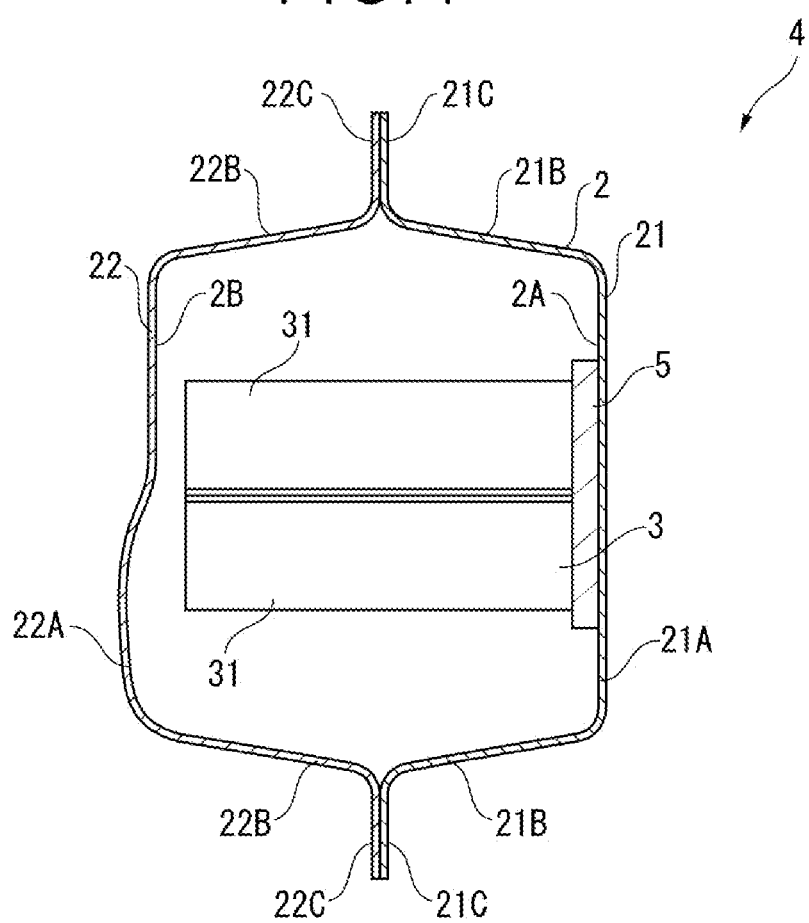
FIG. 4 is a cross-sectional view showing a side sill member according to a second exemplary embodiment of the disclosure.
Figure 5:
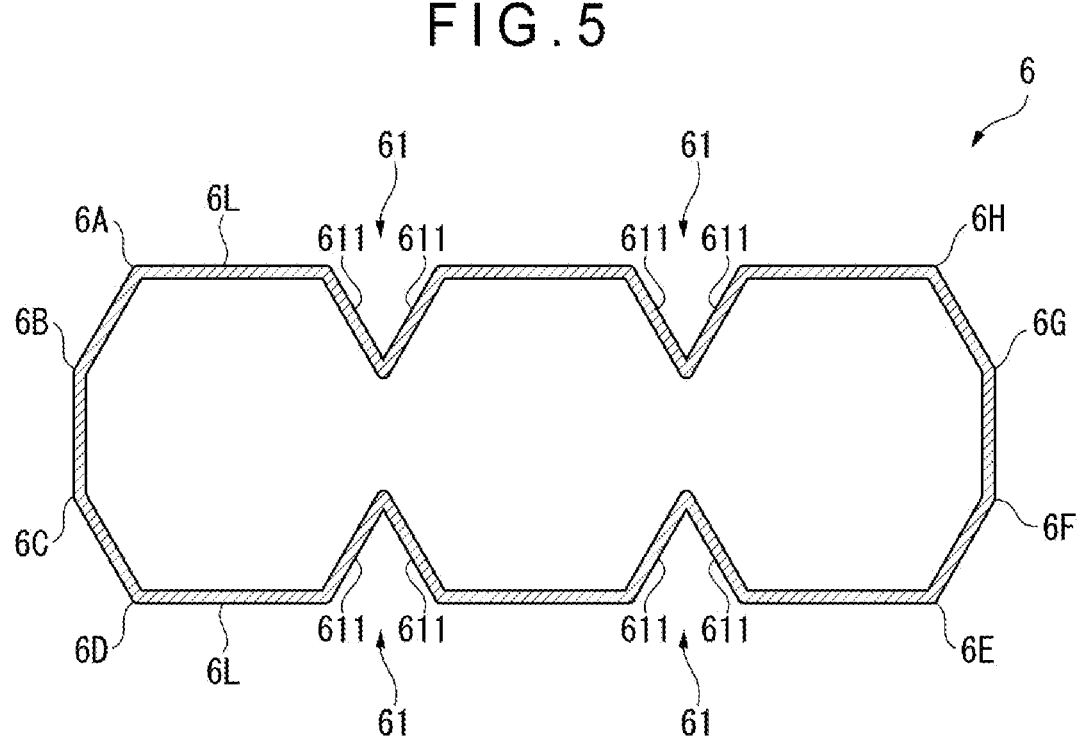
FIG. 5 is a cross-sectional view showing a structure of a reinforcing member for a side sill member according to a third exemplary embodiment of the disclosure.

In contrast, a side sill member 4 according to the second exemplary embodiment includes a first cover 5 that blocks ends of a plurality of reinforcing members 3 facing the first surface 2A, as shown in FIG. 4.

The first cover 5 is provided by, for instance, a rectangular steel sheet. The steel sheet is, for instance, a 1.6-mm thick high-tensile steel having 590 MPa class tensile strength.

The end of each of the reinforcing members 3 facing the first surface 2A is bonded to a facing surface of the first cover 5 by welding or the like. Further, a surface of the first cover 5 opposite the facing surface bonded to the reinforcing member 3 is bonded to the first surface 2A of the hollow member 2 by welding or the like.

When the side sill member 4 is produced, the first cover 5 is initially placed on a table and the reinforcing member 3 is bonded to the first cover 5 by arc welding or the like. Next, the first cover 5 with the reinforcing member 3 is placed on the bottom portion 21A of the inner member 21. Finally, the first cover 5 and the bottom portion 21A are bonded by arc welding or the like. The subsequent assembly process for the side sill member 4 is the same as that in the first exemplary embodiment.

The plurality of reinforcing members 3 of the side sill member 4 are integrated by the first cover 5 to bind the ends of the reinforcing members 3. Uneven deformation and consequent uneven energy absorption, which are caused by the external force partially applied on the reinforcing members 3, can thus be prevented.

The first cover 5 of the side sill member 4 is welded to the bottom portion 21A of the inner member 21. The welding, which can thus be achieved between steel plates, results in enhancement in weldability and widened weld area. Further, since the reinforcing members 3 are integrated by the first cover 5, the number of the welded points can be reduced as compared to an instance where the ends of the reinforcing members 3 are each welded to the bottom portion 21A. It should be noted that the first cover 5, which is disposed to block the ends of the reinforcing members 3 near the first surface 2A in the second exemplary embodiment, is not necessarily thus arranged according to the disclosure. For instance, a second cover that blocks ends of the reinforcing members 3 near the second surface 2B may be provided, or both of the first cover 5 and the second cover may be provided.

3. Third Exemplary Embodiment

Next, a third exemplary embodiment of the disclosure will be described below.

In the above-described first exemplary embodiment, the reinforcing member 3 is provided by the first member 31 and the second member 32 welded and integrated at the flanges 34. In addition, the reinforcing member 3 is provided with four concave grooves 33, each of which has the slant portions 331 and the bottom portion 332.

In contrast, a reinforcing member 6 according to the third exemplary embodiment is an integrated component whose sides are divided by two concave grooves 61. In addition, the cross-sectional profile of the concave grooves 61 is different.

The reinforcing member 6 has a substantially octagonal cross section defined by ridgelines 6A to 6H.

The concave grooves 61 are formed at two points in each of long-side surfaces 6L of the reinforcing member 6. Each of the concave grooves 61 includes two slant portions 611 that intersect at ends in a recessing direction. The slant portions 611, which are surfaces angled by 120 degrees with respect to the respective long-side surfaces 6L, intersect each other at an angle of 60 degrees.

The reinforcing member 6 can be produced by extruding iron, aluminum, synthetic resin or the like and cutting the extruded material at a predetermined length. It should be noted that the reinforcing member 6 is preferably made of aluminum, synthetic resin or the like in terms of adaptability to molding process.

The integrated arrangement of the reinforcing member 6 allows simultaneous production of the reinforcing member 6 through a single extrusion or the like. Accordingly, the workload and, consequently, production cost for producing the reinforcing member 6 can be reduced.

4. Fourth Exemplary Embodiment

Next, a fourth exemplary embodiment of the disclosure will be described below.

In the above-described first exemplary embodiment, the long-side surfaces 3L of the reinforcing member 3 are divided into plural sections by the concave grooves 33.

Figure 6:
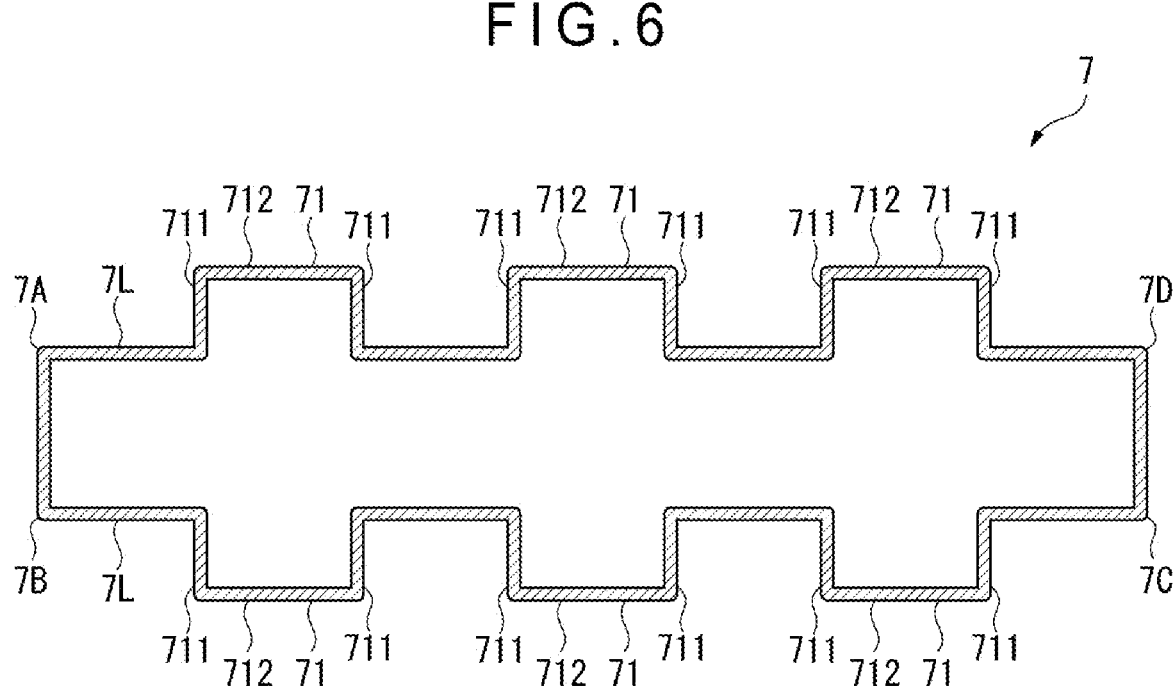
FIG. 6 is a cross-sectional view showing a structure of a reinforcing member for a side sill member according to a fourth exemplary embodiment of the disclosure.

In contrast, a reinforcing member 7 of the fourth exemplary embodiment is a component whose profile is defined by ridgelines 7A to 7D each extending from vertexes of a rectangle and convex portions 71 dividing the longest long-side surfaces 7L, as shown in FIG. 6.

The reinforcing member 7 has a rectangular cross section, whose longest long-side surfaces 7L are mutually oppositely disposed. Two convex portions 71 are formed on each of the long-side surfaces 7L. The convex portions 71 each include lateral portions 711 and an end portion 712.

The lateral portions 711 extend outward (i.e. in out-of-plane direction) to form an angle of 90 degrees with respect to the long-side surfaces 7L. The end portions 712 are surfaces each connecting ends of the corresponding lateral portions 711. The end portions 712 are parallel to the long-side surfaces 7L.

The same effects and advantages as those in the above-described exemplary embodiments can be achieved by the fourth exemplary embodiment.

5. Fifth Exemplary Embodiment

Next, a fifth exemplary embodiment of the disclosure will be described below.

In the above-described first exemplary embodiment, the plurality of concave grooves 33 are provided only in the long-side surfaces 3L of the reinforcing member 3.

Figure 7:
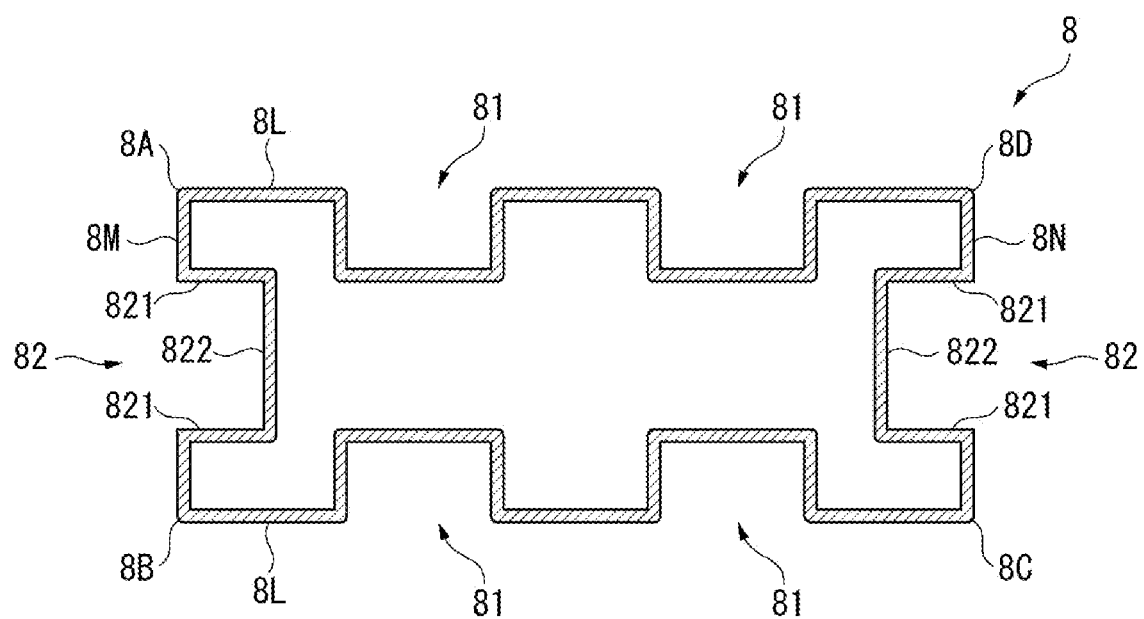
FIG. 7 is a cross-sectional view showing a structure of a reinforcing member for a side sill member according to a fifth exemplary embodiment of the disclosure.

In contrast, a reinforcing member 8 according to the fifth exemplary embodiment is different from the reinforcing member 3 in that the reinforcing member 8 is provided with concave grooves 82 in short-side surfaces 8M, 8N in addition to a plurality of concave grooves 81 provided in a mutually opposing pair of long-side surfaces 8L, as shown in FIG. 7.

The concave grooves 82 are formed in each of a short-side surface 8M between ridgelines 8A and 8B and a short-side surface 8N between ridgelines 8C and 8D, the ridgelines 8A to 8D being located at respective corners of a rectangle profile. The concave grooves 82 each include lateral portions 821 and a bottom portion 822.

The lateral portions 821, which are formed by bending the short-side surfaces 8M, 8N by 90 degrees, are parallel to the long-side surfaces 3L. The bottom portions 822, which connect respective ends of the lateral portions 821 in the recessing direction, are orthogonal to the long-side surfaces 3L.

The same effects and advantages as those in the above-described exemplary embodiments can be achieved by the fifth exemplary embodiment.

6. Sixth Exemplary Embodiment

Next, a sixth exemplary embodiment of the disclosure will be described below.

In the above-described first exemplary embodiment, the plurality of concave grooves 33 are formed in each of the mutually opposing long-side surfaces 3L of the reinforcing member 3.

Figure 8:
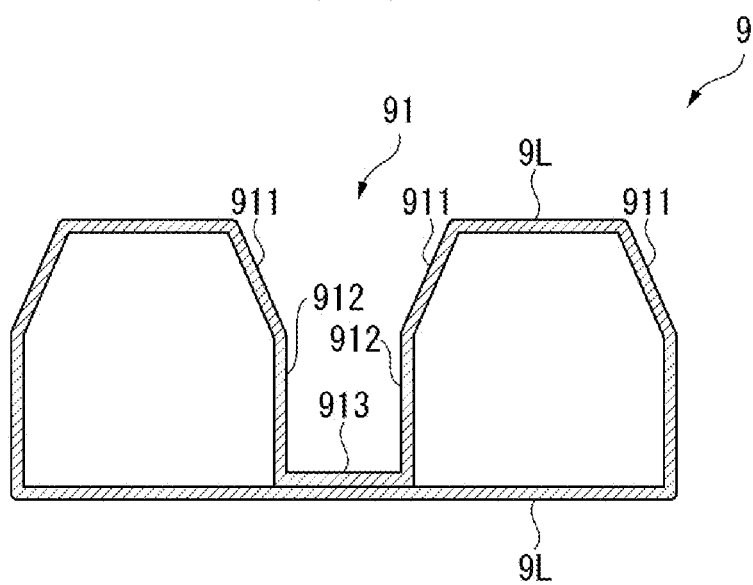
FIG. 8 is a cross-sectional view showing a structure of a reinforcing member for a side sill member according to a sixth exemplary embodiment of the disclosure.

In contrast, a reinforcing member 9 according to the sixth exemplary embodiment is different from the reinforcing member 3 in that the reinforcing member 9 includes a concave groove 91 formed in only one of long-side surfaces 9L and the concave groove 91 is not provided on the other of the long-side surfaces 9L, as shown in FIG. 8.

The concave groove 91 is provided with slant portions 911, vertical portions 912, and a bottom portion 913.

The slant portions 911 are each slanted by a predetermined angle with respect to the long-side surface 9L. The vertical portions 912, which extend from respective ends of the slant portions 911 in a recessing direction of the concave groove 91, define an angle of 90 degrees with respect to the long-side surface 9L. The bottom portion 913, which connects the respective ends of the vertical portions 912, is parallel to the long-side surface 9L. A back side of the bottom portion 913 is bonded to the long-side surface 9L by welding or the like.

The same effects and advantages as those in the above-described exemplary embodiments can be achieved by the sixth exemplary embodiment.

7. Seventh Exemplary Embodiment

Next, a seventh exemplary embodiment of the disclosure will be described below.

In the above-described first exemplary embodiment, the end of the reinforcing member 3 near the first surface 2A is formed by cutting the first member 31 and the second member 32.

In contrast, a side sill member 10 according to the seventh exemplary embodiment is different from the reinforcing member 3 in that the reinforcing member 10 includes flange-shaped outwardly extending portions at a bottom of a reinforcing member 11, as shown in FIG. 9.

The reinforcing member 11 includes a reinforcing member body 111 and flanges 112. The reinforcing member body 111 has the same shape as that of the reinforcing member 3 in the first exemplary embodiment. The flanges 112, which are formed by outwardly bending the reinforcing member body 111, extend outward from the reinforcing member 3. The flanges 112 are in contact with the first surface 2A of the hollow member 2. Contact surfaces of the flanges 112 may be welded or not welded. However, when the flanges 112 are bonded by welding, the reinforcing member 11 is integrated with the hollow member 2, so that the strength of the reinforcing member 11 can be enhanced.

Inner sides of the reinforcing member 11 are in contact with protrusions 113 formed on the first surface 2A at parts inside the reinforcing member 11. The protrusions 113 can be formed on the inner side of the first surface 2A by build-up welding or the like. The protrusions 113 restrict a movement of the reinforcing member 11 in a direction along the first surface 2A, thus further enhancing the reinforcing effect.

The same effects and advantages as those in the above-described exemplary embodiments can be achieved by the seventh exemplary embodiment.

8. Eighth Exemplary Embodiment

Next, an eighth exemplary embodiment of the disclosure will be described below.

In the above-described second exemplary embodiment, the first cover 5 is made of a rectangular steel sheet.

Figure 10A:
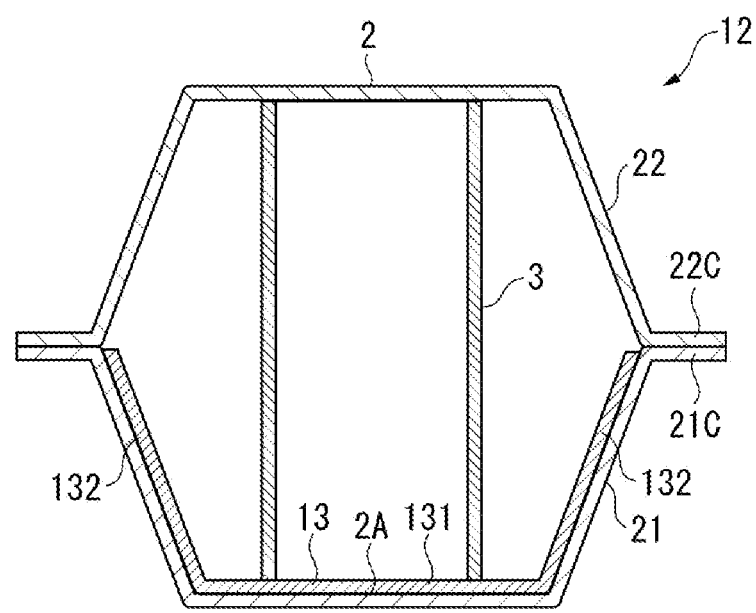
FIG. 10A is a cross-sectional view showing a side sill member according to an eighth exemplary embodiment of the disclosure.

In contrast, a first cover 13 of a side sill member 12 according to the eighth exemplary embodiment is of a different shape as shown in FIG. 10A.

The first cover 13 is interposed between the reinforcing member 3 and the first surface 2A of the hollow member 2. The first cover 13, which has a trapezoidal cross section, is formed by bending a steel sheet. The first cover 13 includes a bottom portion 131 and slant surfaces 132.

A first side of the bottom portion 131 is in contact with the end of the reinforcing member 3 near the first surface 2A. A second side of the bottom portion 131 is in contact and welded with the first surface 2A. The slant surfaces 132 rise from respective ends of the bottom portion 131 by a predetermined angle. The slant angle of the slant surfaces 132 is determined so that the slant surfaces 132 conform to the inner shape of the inner member 21 of the hollow member 2.

Ends of the respective slant surfaces 132 reach the points of the inner member 21 of the hollow member 2 at which the inner member 21 is bent to form the flanges 21C.

The same effects and advantages as those in the above-described exemplary embodiments can be achieved by the eighth exemplary embodiment.

The first cover 13, which is made of the trapezoidal steel sheet, does not move inside the hollow member 2. Thus, a relative movement of the reinforcing member 3 and the hollow member 2 can be prevented, thereby further enhancing the reinforcing effect by the reinforcing member 3.

Figure 10B:
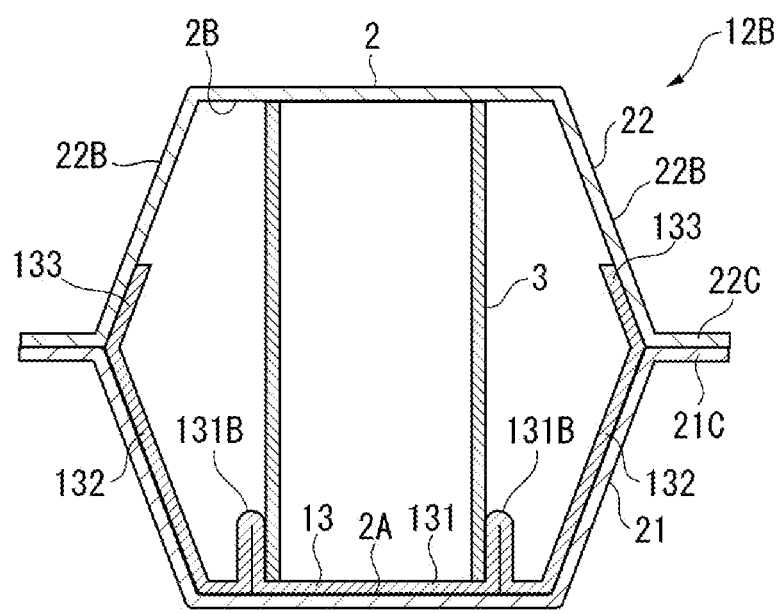
FIG. 10B is a cross-sectional view showing a side sill member according to a modification of the eighth exemplary embodiment.

The eighth exemplary embodiment may be further modified. For instance, extensions 133 may be provided at the respective ends of the slant surfaces 132 of the first cover 13 of a side sill member 12B as shown in FIG. 10B. The extensions 133 extend to a point nearer to the second surface 2B than the first surface 2A of the hollow member 2. The extensions 133 are bonded to lateral portions 22B of the outer member 22 of the hollow member 2 by welding or the like.

Bent protrusions 131B are formed on the bottom portion 131 of the first cover 13. The bent protrusions 131B are in contact with outer sides of the reinforcing member 3. The bent protrusions 131B restrict a movement of the reinforcing member 3 in a direction along the first surface 2A, thus further enhancing the reinforcing effect.

When the hollow member 2 of the side sill member 12B is subjected to crush deformation, the bonded portions between the extensions 133 and the lateral portions 22B are deformed in a compression direction. The bonded portions are more unlikely to be destroyed by the compression deformation than tensile deformation in view of the influence of the heat affected zone. Accordingly, the bonding strength of the bonded portion can be enhanced at the time of the crush deformation.

Figure 10C:
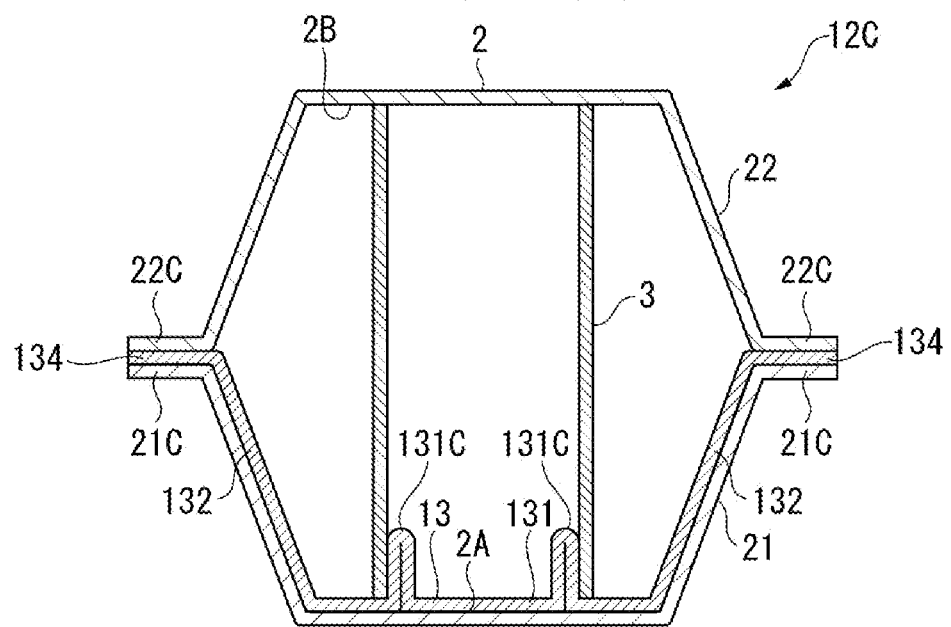
FIG. 10C is a cross-sectional view showing a side sill member according to another modification of the eighth exemplary embodiment.

As shown in FIG. 10C, ends of the first cover 13 of the side sill member 12C may be bent to form flanges 134, each of which may be held between the flange 21C and the flange 22C of the hollow member 2.

Bent protrusions 131C are formed on the bottom portion 131 of the first cover 13. The bent protrusions 131C are in contact with inner sides of the reinforcing member 3. The movement of the reinforcing member 3 in the direction along the first surface 2A is also restricted by this arrangement, thus further enhancing the reinforcing effect.

The side sill member 12C, which completely restricts the movement of the first cover 13, further enhances the reinforcing effect by the reinforcing member 3.

9. Ninth Exemplary Embodiment

Next, a ninth exemplary embodiment of the disclosure will be described below.

In the side sill member 1 according to the above-described first exemplary embodiment, the reinforcing member 3 is welded to the bottom portion 21A of the inner member 21 of the hollow member 2.

Figure 11:
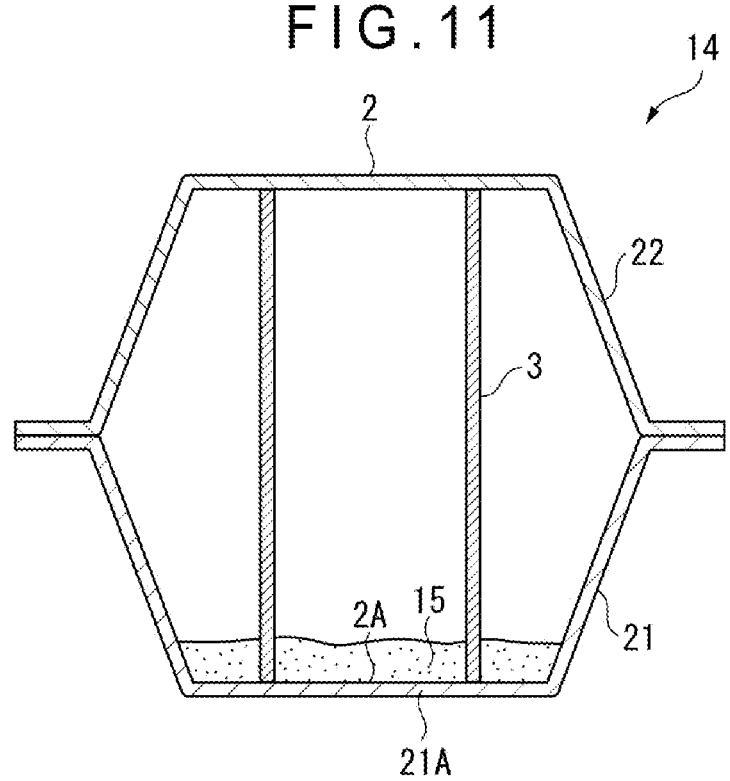
FIG. 11 is a cross-sectional view showing a side sill member according to a ninth exemplary embodiment of the disclosure.

In contrast, the reinforcing member 3 of a side sill member 14 according to the ninth exemplary embodiment is different from the first exemplary embodiment in that the reinforcing member 3 is bonded to the first surface 2A of the hollow member 2 by an adhesive 15, as shown in FIG. 11. The adhesive 15 may be any adhesive such as thermosetting synthetic resin adhesive and photo-curable synthetic resin adhesive. It should be noted that the adhesive 15 is preferably added with a flame retardant or the like to provide fire resistance.

When the side sill member 14 is produced, the bottom portion 21A of the inner member 21 of the hollow member 2 is placed on a table or the like. Then, after the reinforcing member 3 is placed on the bottom portion 21A, the adhesive 15 is poured into a dent of the hat-shape of the inner member 21. Finally, the adhesive 15 is cured by, for instance, applying heat on the adhesive 15 or illuminating the adhesive 15 with light. The subsequent assembly process for the side sill member 14 is the same as that in the first exemplary embodiment.

The adhesive 15 can bond the hollow member 2 and the reinforcing member 3 even when the hollow member 2 and the reinforcing member 3 are made of different materials. Accordingly, the materials of the hollow member 2 and the reinforcing member 3 are more freely selectable to provide the side sill member 14 with desired performance.

Further, the reinforcing member 3, which can be bonded to the hollow member 2 only by pouring the adhesive 15 in the dent of the hat-shape of the inner member 21 of the hollow member 2, is easily installable.

10. Tenth Exemplary Embodiment

Next, a tenth exemplary embodiment of the disclosure will be described below.

In the above-described first exemplary embodiment, the reinforcing member 3 is joined so that the long-side surfaces 3L of the first and second members 31, 32 are parallel to each other.

Figure 12:
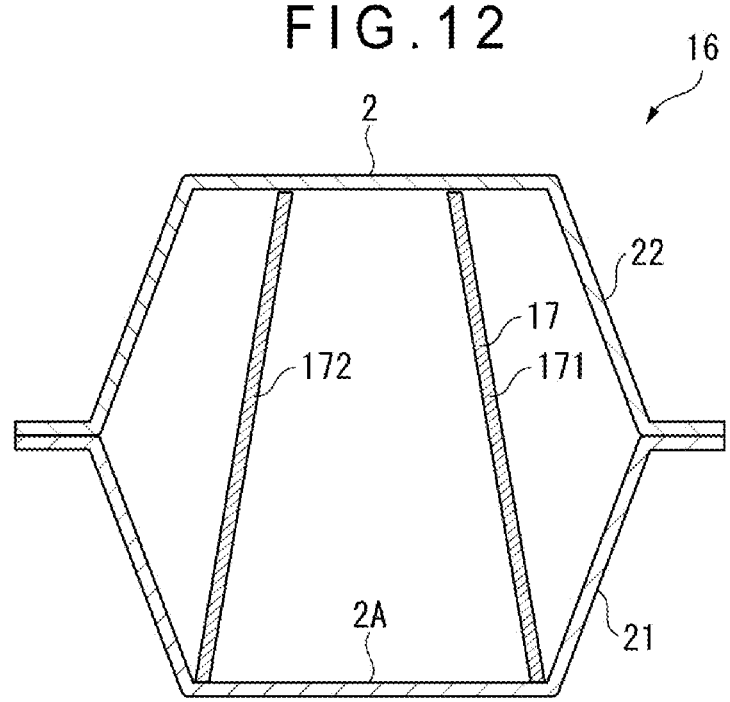
FIG. 12 is a cross-sectional view showing a side sill member according to a tenth exemplary embodiment of the disclosure.

In contrast, a side sill member 16 according to the tenth exemplary embodiment includes a reinforcing member 17 whose cross-sectional profile is different in an axial direction, as shown in FIG. 12. Specifically, the reinforcing member 17 is gradually tapered from the first surface 2A of the hollow member 2 toward an end of the reinforcing member 17.

The reinforcing member 17 includes a first member 171 and a second member 172. Though not shown, a cross section of the first member 171 is similar to that of the first member 31 in the first exemplary embodiment. However, the dent of the concave grooves of the first member 171 becomes gradually shallow from the end near the first surface 2A. The dent of the concave grooves of the second member 172 also becomes shallow in the same manner as the first member 171. When an external force is applied, buckling preferentially occurs at a portion of the reinforcing member 17 with small cross sectional area. Accordingly, buckling can be sequentially caused in the reinforcing member 17 from a part located near an outside of the vehicle body. In other words, the reinforcing member 17 is not easily bent and buckling stably occurs.

Flanges formed on ends of the first member 171 and the second member 172 are butt-welded to produce the reinforcing member 17.

The same effects and advantages as those in the above-described exemplary embodiments can be achieved by the tenth exemplary embodiment.

11. Eleventh Exemplary Embodiment

Next, an eleventh exemplary embodiment of the disclosure will be described below.

The end of the reinforcing member 3 near the outer member 22 is in a single virtual plane in the above-described first exemplary embodiment.

Figure 13:
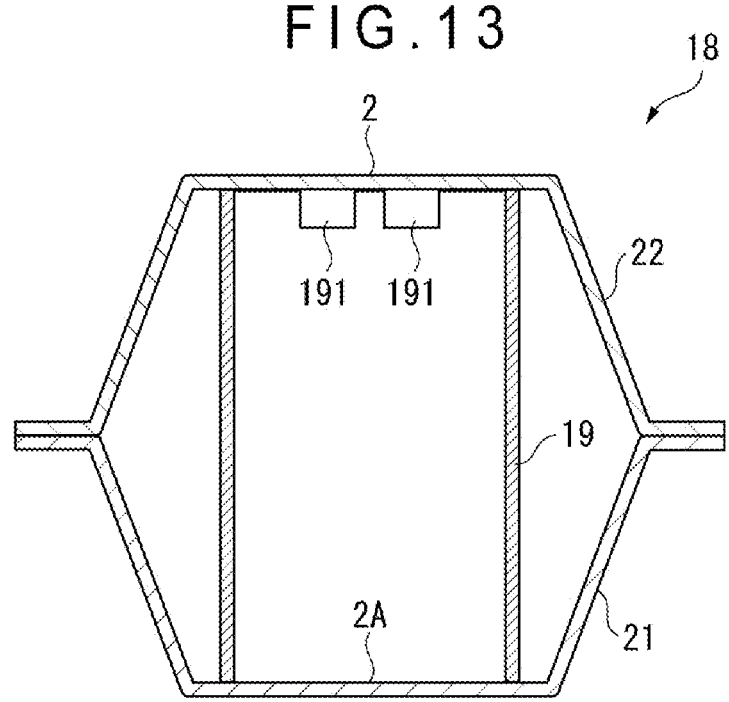
FIG. 13 is a cross-sectional view showing a side sill member according to an eleventh exemplary embodiment of the disclosure.

In contrast, a reinforcing member 19 of a side sill member 18 according to the eleventh exemplary embodiment is different from the reinforcing member 3 in that the reinforcing member 19 includes a plurality of cut portions 191 at an end of the reinforcing member 19 near the outer member 22, as shown in FIG. 13.

The plurality of cut portions 191, which are arranged along the width direction of the reinforcing member 19, each have a rectangular profile. The cut portions 191 can be formed by cutting the first and second members of the reinforcing member 19 using a blade with square teeth. It should be noted that the cut portions 191 are not necessarily configured as described above but may have a triangular profile(s).

The same effects and advantages as those in the above-described exemplary embodiments can be achieved by the eleventh exemplary embodiment.

Further, when a force in an axial direction is applied, the part provided with the cut portions 191 first collapses due to the presence of the plurality of cut portions 191. A part of the reinforcing member 19 adjacent to the buckled part in the axial direction is also deformed, where the reinforcing member 19 is more easily buckled than at an undeformed part of the reinforcing member 19, so that the buckling tends to easily extend in the axial direction of the reinforcing member 19. In other words, the part provided with the cut portion 191 is initially buckled, so that the buckling sequentially occurs from an outside to an inside of the reinforcing member 19 in the axial direction.

12. Modification(s)

It should be noted that the disclosure is not limited to the above-described exemplary embodiments, but may be modified as long as such modification(s) is compatible with an object of the disclosure.

Figure 14:
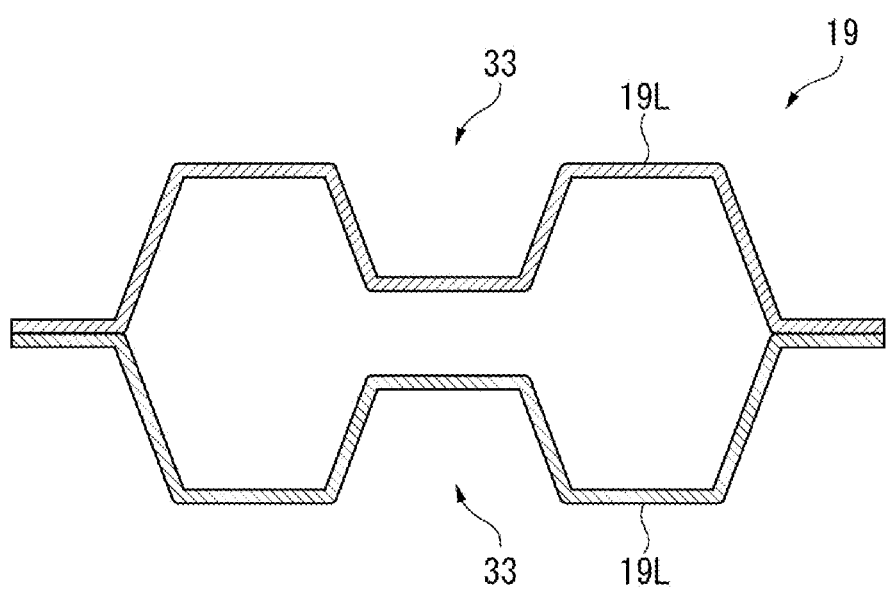
FIG. 14 is a cross-sectional view showing a structure of a reinforcing member according to a modification of the exemplary embodiments.

In the above-described first exemplary embodiment, four concave grooves 33 are formed in each of the long-side surfaces 3L to provide the reinforcing member 3. However, the disclosure is not necessarily configured as in the first exemplary embodiment. For instance, the reinforcing member 19 in some embodiments has only one concave groove 33 in each of the long-side surfaces 19L, as shown in FIG. 14.

Figure 15:
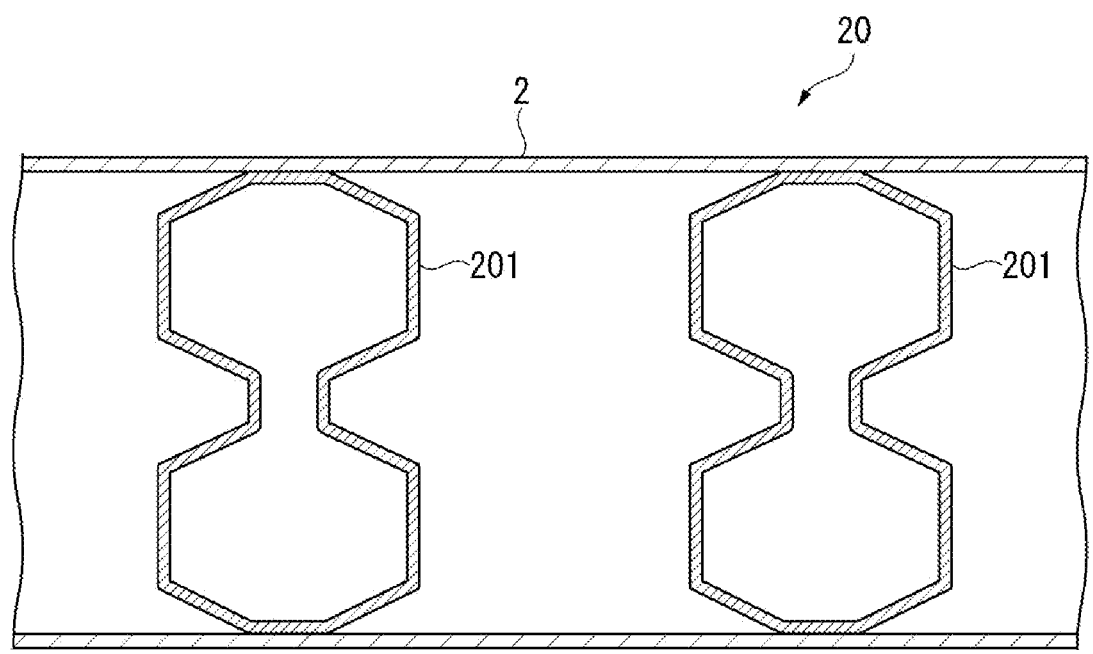
FIG. 15 is a cross-sectional view showing a structure of a side sill member according to a modification of the exemplary embodiments.

In the above-described first exemplary embodiment, the reinforcing member 3 is arranged so that the longitudinal direction of the cross section with respect to the axis of the reinforcing member 3 extends along the longitudinal direction of the hollow member 2. However, the disclosure is not necessarily configured as in the first exemplary embodiment. For instance, a reinforcing member 201 is arranged so that the longitudinal direction of the reinforcing member 201 extends in a direction orthogonal to the longitudinal direction of the hollow member 2 to provide a side sill member 20 in some embodiments, as shown in FIG. 15.

In addition, a specific structure, shape, and the like for implementation of the disclosure may be modified as long as an object of the invention is achievable.

EXAMPLES

Bending resistance and crush resistance of the side sill member 1 of the first exemplary embodiment and the side sill member 4 of the second exemplary embodiment were evaluated.

1. Evaluation of Bending Resistance

Figure 16:
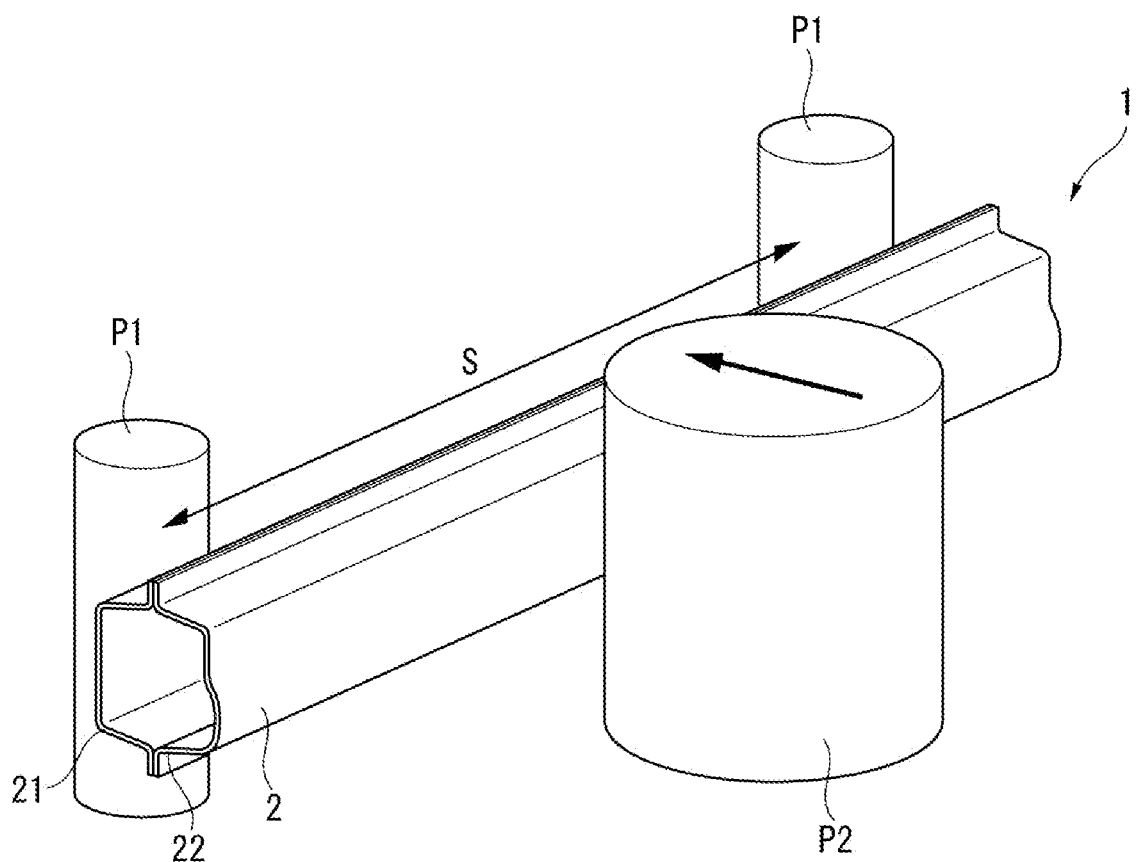
FIG. 16 is an illustration schematically showing a test method for evaluating the bending resistance in Examples.

As shown in FIG. 16, while the side sill member 1 (Example 1) was supported by two poles P1, a pole P2 was hit at the center of the side sill member 1 to apply an impact load, thereby evaluating the bending resistance of the side sill member 1. In the hollow member 2 of the side sill member 1, the reinforcing member 3 made of a high-tensile steel with 1.6 mm thickness and 590 MPa class tensile strength was installed. The reinforcing member 3 weighed 880 g per piece.

A support span S between the poles P1 was set at 1000 mm. The pole P2 was 250 mm in diameter with a telephone pole in mind. A bending load was applied from the side of the outer member 22 of the hollow member 2 to be located outside a vehicle body.

As a Comparative, the bending resistance was evaluated for a side sill member not provided with the reinforcing member 3 inside the hollow member 2.

The characteristic value for the evaluation was a value calculated by dividing the load applied by the pole P2 by a mass of the side sill member (load/mass of the member: kN/kg).

Figure 17:
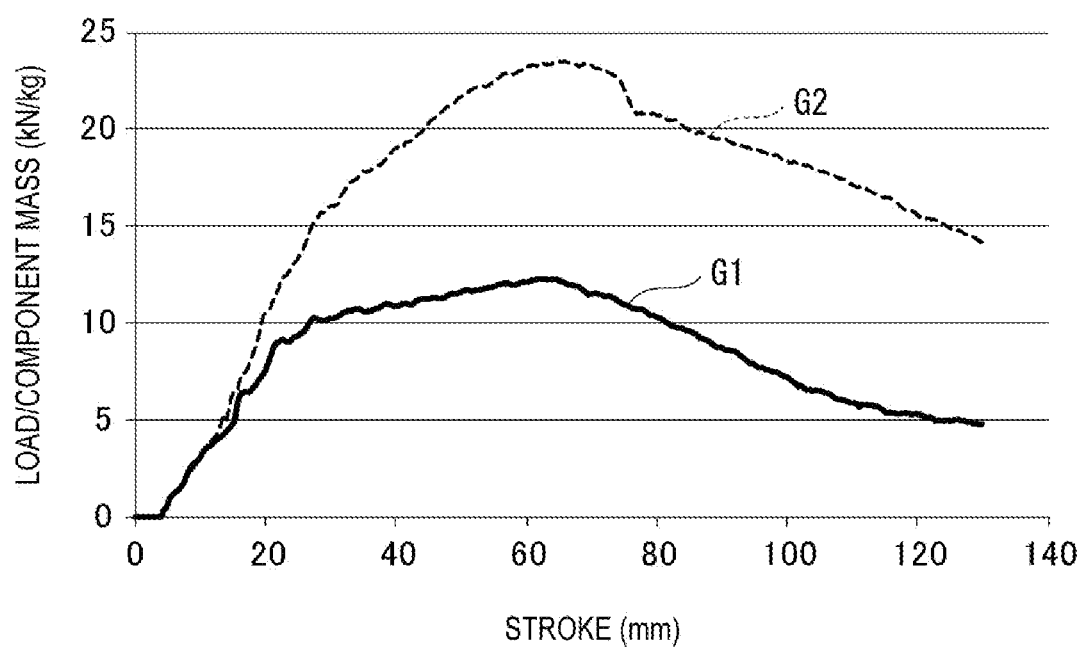
FIG. 17 is a graph showing the results of the bending resistance in Example and Comparative.

The results of the evaluation of the bending resistance for Example 1 and Comparative are shown in FIG. 17. It should be noted that the horizontal axis of FIG. 17 is a stroke of the pole P2 (i.e. a displacement of the pole P2 after contacting the side sill member 1).

In the Comparative, the bending resistance was 15 kN/kg at the maximum as shown in a graph G1 in FIG. 17.

In contrast, the maximum value in Example 1 was 20 kN/kg or more as shown in a graph G2 in FIG. 17. Accordingly, it is confirmed that the reinforcing member 3 installed inside the hollow member 2 can significantly enhance the bending resistance without considerable increase in the component weight.

2. Evaluation of Crush Resistance

Figure 18:
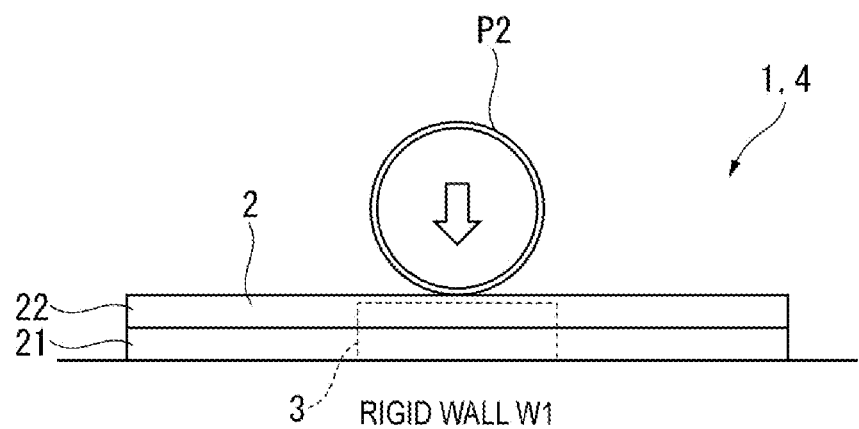
FIG. 18 is an illustration schematically showing a test method for evaluating the crush resistance in Examples.

As shown in FIG. 18, while the side sill member 1(4) was supported by a rigid wall W1, an external force was applied to the center of the side sill member 1(4) by the pole P2 to evaluate the crush resistance of the side sill member 1(4). The rigid wall was placed vertically with respect to an application direction of the external force.

The external force of the 250-mm-diameter pole P2 was applied to a part (center) of the side sill member 1(4) where the reinforcing member 3 was placed.

As a Comparative, the crush resistance was evaluated for a side sill member not provided with the reinforcing member 3 inside the hollow member 2, as in evaluating the performance against the bending load.

The characteristic value for the evaluation was also the value calculated by dividing the load applied by the pole P2 by the mass of the side sill member 1(4) (load/mass of the member: kN/kg), as in evaluating the bending resistance.

Figure 19:
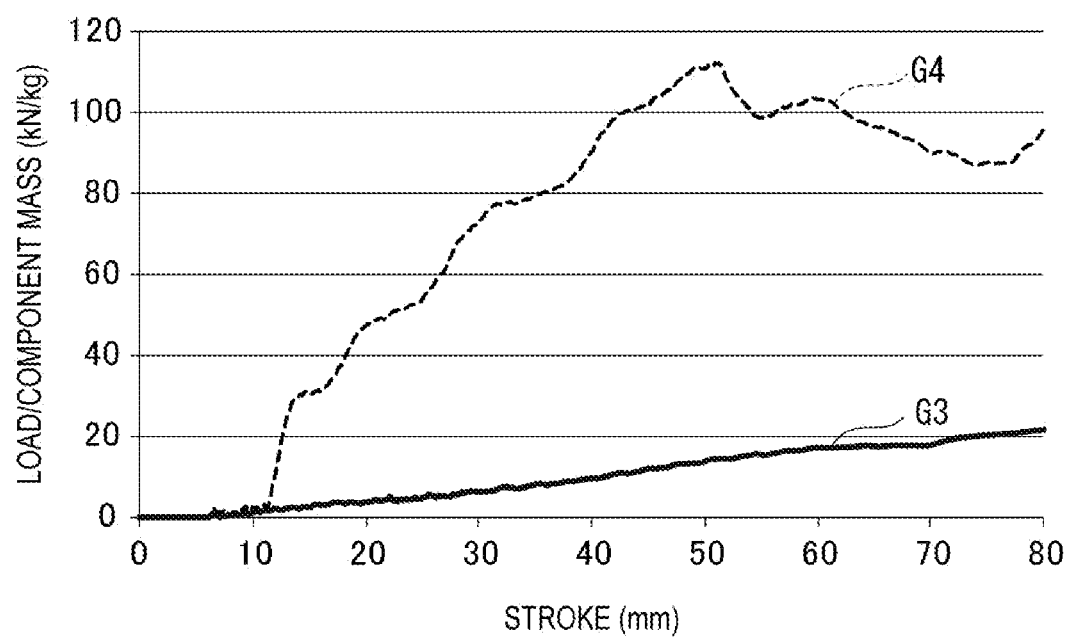
FIG. 19 is a graph showing the results of the crush resistance in Example and Comparative.

The results of comparison of the crush resistances between the side sill member 1 (Example 2) and the side sill member (Comparative) not provided with the reinforcing member 3 therein are shown in FIG. 19.

In the Comparative, the crush resistance was approximately 20 kN/kg at the maximum as shown in a graph G3 in FIG. 19.

In contrast, the crush resistance of Example 1 was 100 kN/kg at the maximum as shown in a graph G4 in FIG. 19. Accordingly, it is confirmed that the reinforcing member 3 installed inside the hollow member 2 can significantly enhance the crush resistance without considerable increase in the component weight.

Figure 20:
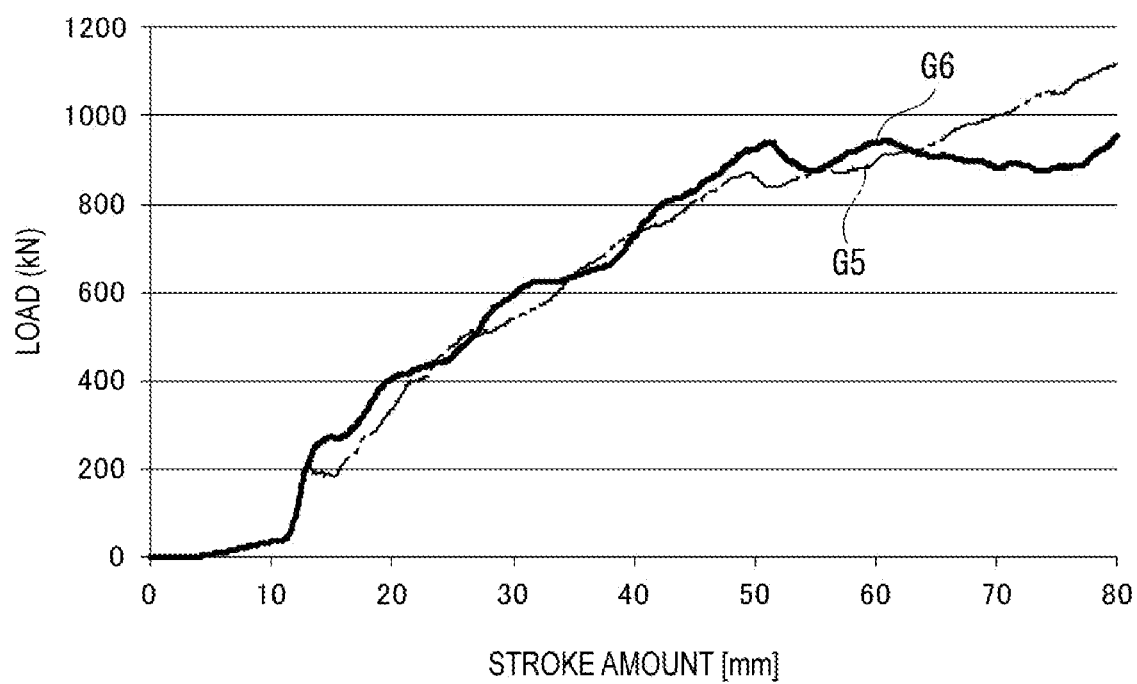
FIG. 20 is a graph showing the results of the crush resistance against a vertical load in Examples.

The results of comparison of crush resistances between the side sill member 1 (Example 3) described in the first exemplary embodiment and the side sill member 4 (Example 4) provided with the first cover 5 described in the second exemplary embodiment as evaluated through the method shown in FIG. 18 are shown in FIG. 20.

The results of Example 3 are shown in a graph G5 in FIG. 20. In contrast, the results of Example 4 are shown in a graph G6 in FIG. 20.

It is confirmed that Examples 3 and 4 both show excellent results. Accordingly, it is confirmed that the side sill members 1, 4 have approximately the same crush resistance against a load applied in the vertical direction.

Figure 21:
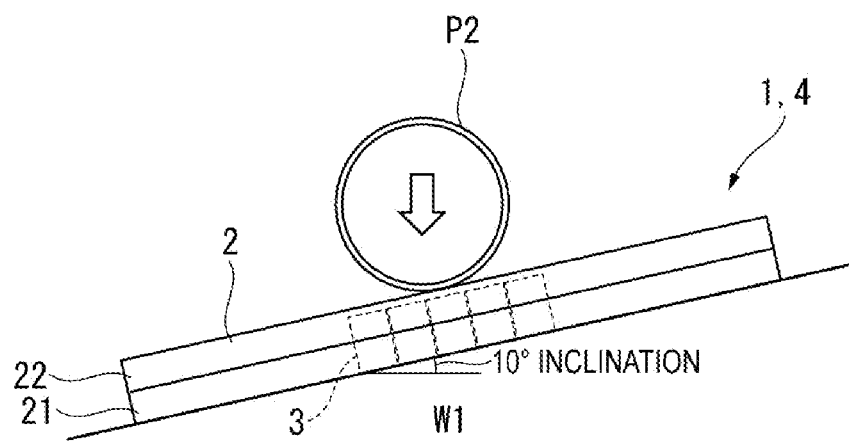
FIG. 21 is an illustration schematically showing a modified test method for evaluating the crush resistance in Examples.

As shown in FIG. 21, the rigid wall W1 for supporting the side sill member 1(4) was slanted by 10 degrees from the state shown in FIG. 18 for evaluation of the crush resistance of the side sill member 1(4) when the external force was obliquely applied to the side sill member 1.

The load bearing capacity in an oblique direction, which is supposed to be an index for the performance of a vehicle when obliquely hitting a telephone pole or the like, is one of items measured in a side crash test performed in NHTSA (National Highway Traffic Safety Administration).

Figure 22:
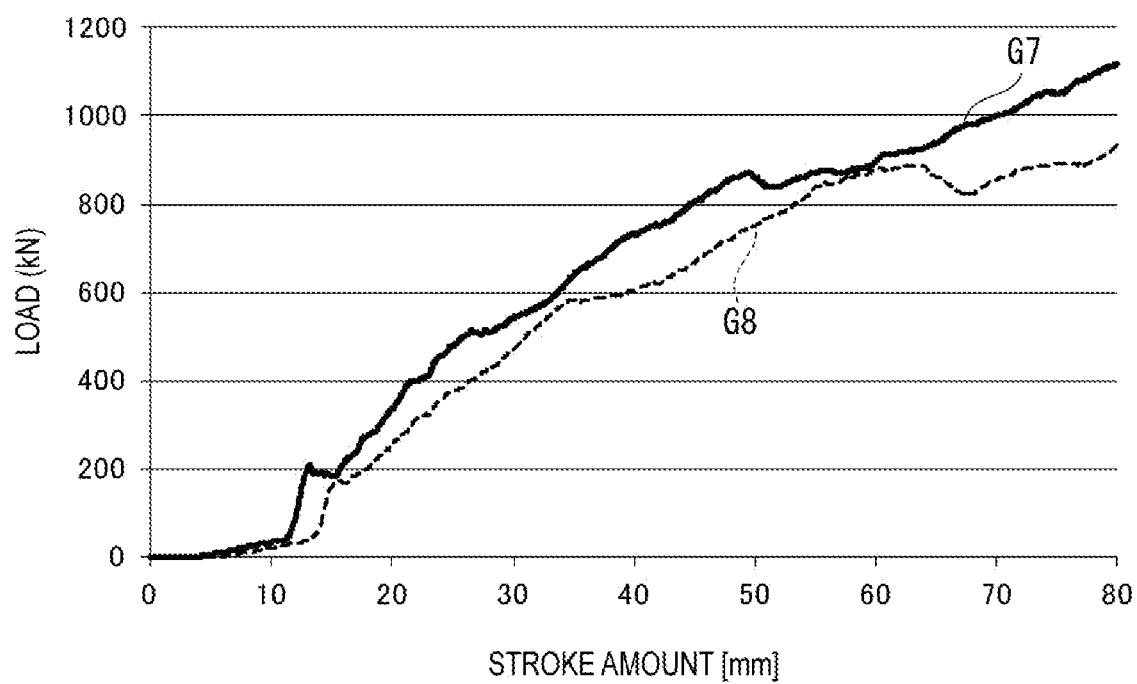
FIG. 22 is a graph showing the results of the crush resistance with external forces in different directions of action of in Examples.

The results of the crush resistance of the side sill member 1 when the external force is applied in a vertical direction as shown in FIG. 18 (Example 5) and when the external force is obliquely applied (Example 6) as shown in FIG. 21 are shown in FIG. 22.

The results in Example 5, which are shown in a graph G7 in FIG. 22, show sufficient crush resistance. However, the results in Example 6, which are shown in a graph G8 in FIG. 22, show that the crush resistance is, though at a sufficient level, inferior to that in Example 5.

Figure 23:
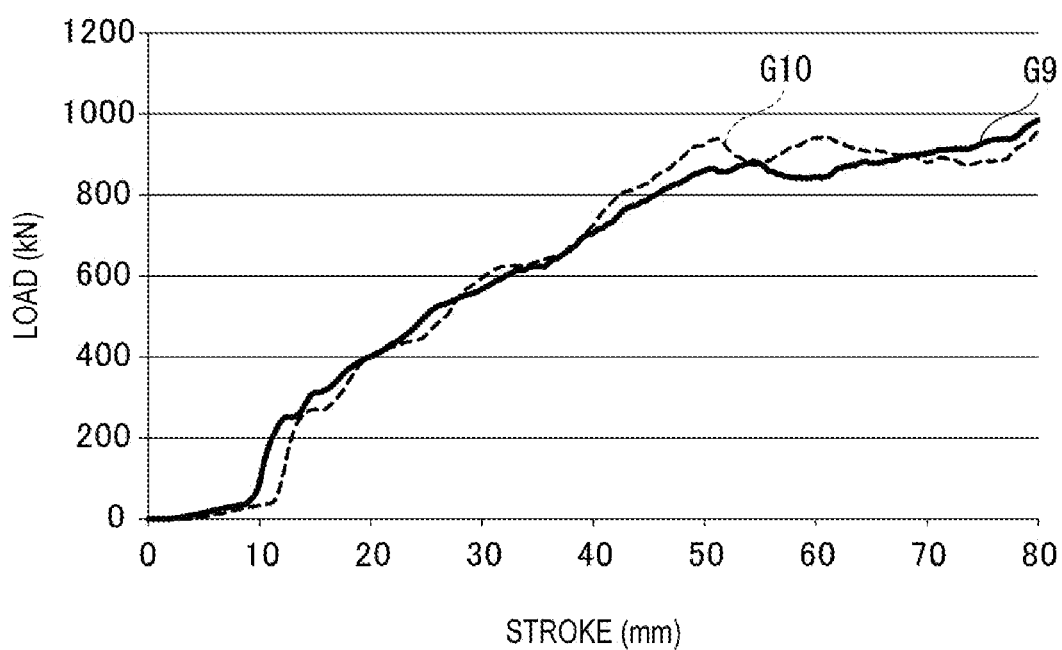
FIG. 23 is another graph showing the results of the crush resistance with external forces in different directions of action of the external force in Examples.

In contrast, the results of the side sill member 4 employing the first cover 5 are shown in FIG. 23. The results when the external force is applied in a vertical direction (Example 7) is shown by a graph G9 in FIG. 23. The results when the external force is obliquely applied (Example 8) are shown by a graph G10 in FIG. 23. It is confirmed that the side sill member 4 shows approximately the same crush resistance in both instances.

The results show that the crush resistance of the side sill member 4 does not greatly change even when the external force is applied in a direction other than the axial direction of the reinforcing member 3, which means that the side sill member 4 is highly robust.

The invention claimed is:

1. A side sill member comprising:
   a hollow member;
   a reinforcing member; and
   a first cover, wherein
   the hollow member comprises therein mutually facing first and second surfaces,
   the reinforcing member stands on the first surface or the second surface in the hollow member,
   the reinforcing member is a tubular component having a polygonal cross section,
   a longest side of the polygonal cross section has a groove extending along an axial direction of the tubular component,
   the first cover is welded to the reinforcing member to block an end of the reinforcing member near the first surface, and
   the first cover is welded to the first surface.

2. The side sill member according to claim 1, wherein the first cover is welded to a lateral portion of the hollow member between the first surface and the second surface.

3. The side sill member according to claim 2, wherein the first cover is welded to a part of the hollow member near the second surface with respect to the first surface.

4. The side sill member according to claim 1, wherein a second cover that blocks an end of the reinforcing member near the second surface is welded to the reinforcing member.

5. The side sill member according to claim 1, wherein the polygonal cross section of the reinforcing member is line-symmetric.

6. The side sill member according to claim 1, wherein the reinforcing member is made of a steel material.

7. The side sill member according to claim 1, wherein the hollow member is made of a steel material.

8. A vehicle comprising the side sill member according to claim 1, the side sill member being installed so that the first surface of the hollow member is situated near an inside of the vehicle and the second surface is situated near an outside of the vehicle.

* * * * *